(12) United States Patent
Eder et al.

(10) Patent No.: US 11,824,616 B2
(45) Date of Patent: Nov. 21, 2023

(54) RECEIVING BEAM SELECTION USING HYBRID CHANNEL BASED BEAMFORMING AND CODEBOOK BASED BEAMFORMING

(71) Applicant: Apple Inc., Cupertino, CA (US)

(72) Inventors: Franz J. Eder, Neubiberg (DE); Adrian Carlos Loch Navarro, Munich (DE); Andre Janssen, Munich (DE); Holger Neuhaus, Munich (DE); Kenan Kocagoez, Fürth (DE)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/899,178

(22) Filed: Aug. 30, 2022

(65) Prior Publication Data
US 2023/0066493 A1    Mar. 2, 2023

Related U.S. Application Data

(60) Provisional application No. 63/238,705, filed on Aug. 30, 2021.

(51) Int. Cl.
*H04B 7/02* (2018.01)
*H04B 7/08* (2006.01)
*H04B 7/06* (2006.01)

(52) U.S. Cl.
CPC ......... *H04B 7/0857* (2013.01); *H04B 7/0617* (2013.01); *H04B 7/0639* (2013.01); *H04B 7/086* (2013.01); *H04B 7/088* (2013.01)

(58) Field of Classification Search
CPC .. H04B 7/0857; H04B 7/0617; H04B 7/0639; H04B 7/086; H04B 7/088
USPC .......... 375/347, 354, 219, 295, 316
See application file for complete search history.

(56) References Cited

U.S. PATENT DOCUMENTS

2023/0033247 A1*  2/2023  Zhu ................... H04W 24/08

* cited by examiner

*Primary Examiner* — Zewdu A Kassa
(74) *Attorney, Agent, or Firm* — Sterne, Kessler, Goldstein & Fox P.L.L.C.

(57) ABSTRACT

Some aspects relate to apparatuses and methods for selecting a receiving beam based on hybrid channel based beamforming and codebook based beamforming. A user equipment (UE) can determine, based on a first measurement related to signal to noise ratio (SNR) and predetermined threshold values, whether the UE is in a low SNR state. If the UE is in a low SRN state, the UE can derive an estimated channel covariance matrix $R_{CH}$ for channels at a set of antenna elements of the UE based on channel based beamforming (CHBF). Afterwards, a set of test beams $\{0, \ldots N_{test}-1\}$ is selected based on the channel covariance matrix $R_{CH}$, and a set of codebook measurement beams is further selected based on the set of test beams. A receiving beam is selected based on a set of measurements performed on the set of codebook measurement beams at the measurement opportunity for codebook based beamforming (CBBF).

20 Claims, 6 Drawing Sheets

RECEIVING BEAM SELECTION USING HYBRID CHANNEL BASED BEAMFORMING AND CODEBOOK BASED BEAMFORMING

CROSS REFERENCE TO RELATED APPLICATIONS

The present application claims the benefit of U.S. provisional patent application No. 63/238,705, filed on Aug. 30, 2021, which is incorporated by reference herein in its entirety.

BACKGROUND

Field

The described aspects generally relate to the selection of receiving beams in a multiple input-multiple output (MIMO) wireless communication system.

Related Art

A user equipment (UE) communicates with a base station, such as an evolved Node B (eNB), a next generation node B (gNB), or other base station, in a wireless communication network or system. A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). Multiple input-multiple output (MIMO) is an important technology for wireless systems.

SUMMARY

Some aspects of this disclosure relate to apparatuses and methods for implementing techniques for a user equipment (UE) or a base station to select a receiving beam based on hybrid channel based beamforming and codebook based beamforming in a multiple input-multiple output (MIMO) wireless system. Descriptions herein may be provided for the UE as examples. Techniques can be similarly applicable to a base station when beamforming is used by the base station.

Some aspects of this disclosure relate to a UE. The UE may include a set of antenna elements, a transceiver coupled to the set of antenna elements, and a processor communicatively coupled to the transceiver. The transceiver is configured to communicate with a base station. The processor is configured to perform operations to select a receiving beam based on hybrid channel based beamforming and codebook based beamforming when the UE is in a low signal to noise ratio (SNR) state. In detail, the processor can be configured to determine, based on a first measurement related to SNR, such as a SNR measurement and a rotation measurement, and one or more predetermined threshold values, whether the UE is in a low SNR state. In some embodiments, the processor can be configured to determine whether the SNR measurement is below a SNR threshold, and whether the rotation measurement is below a rotation threshold. In response to a determination that the SNR measurement is below the SNR threshold, and a determination that the rotation measurement is below the rotation threshold, the processor can be configured to make the determination that the UE is in the low SNR state.

In some embodiments, in response to a determination that the UE is in the low SNR state, the processor can be configured to derive, based on a second measurement such as a synchronization signal blocks (SSB) measurement or a Channel State Information Reference Signal (CSI-RS) measurement, an estimated channel covariance matrix $R_{CH}$ for channels at the set of antenna elements of the UE based on channel based beamforming (CHBF), and further select a receiving beam of the UE based on codebook based beamforming (CBBF). In some embodiments, in response to a determination that the UE is not in the low SNR state, the processor can be configured to perform CHBF to select the receiving beam of the UE based on the estimated channel covariance matrix $R_{CH}$ for channels at the set of antenna elements of the UE.

In further detail, the processor can be configured to select a set of test beams $\{0, \ldots N_{test}-1\}$, where a test beam can be an element of a codebook (CB) for communication between the UE and the base station, and the set of test beams can be a smaller subset of the codebook. Based on the set of test beams and the estimated channel covariance matrix $R_{CH}$, the processor can be configured to calculate a set of third measurements such as a Reference Signal Received Power (RSRP) corresponding to the set of test beams, where a test beam has an associated third measurement included in the set of third measurements. In addition, the processor can be configured to select a set of codebook measurement beams including a number $N_{CB,max}$ of beams from the set of test beams based on the calculated set of third measurements, where the number $N_{CB,max}$ is determined based on a number of beams that can be measured at a measurement opportunity. For example, the number $N_{CB,max}$ can be a maximum number of beams that can be measured at the measurement opportunity. In some examples, the processor can be configured to select the number $N_{CB,max}$ of beams from the set of test beams having $N_{CB,max}$ highest calculated third measurements.

Afterwards, the processor can be configured to perform a set of fourth measurements such as a set of RSRPs on the set of codebook measurement beams at the measurement opportunity for CBBF, and select a receiving beam of the UE having a best fourth measurement among the set of fourth measurements on the set of codebook measurement beams. In some embodiments, the processor can be configured to determine whether the selected receiving beam of the UE for CBBF is unreliable based on a tracking reliability indicator of the selected receiving beam.

In some embodiments, the set of antenna elements can be a first set of antenna elements of the UE, the receiving beam is a first receiving beam for the first set of antenna elements, and the UE further includes a second set of antenna elements to form a cross polarized antenna array for the UE with the first set of antenna elements. The processor can be further configured to select a second receiving beam of the UE among the second set of antenna elements, based on a joint codebook for the first set antenna elements and the second set of antenna elements.

In some embodiments, the set of fourth measurements on the set of codebook measurement beams at the measurement opportunity is a first set of fourth measurements on a first set of codebook measurement beams at a first measurement opportunity. The processor can be further configured to select a second set of codebook measurement beams including the number $N_{CB,max}$ of beams from the set of test beams based on the calculated set of third measurements, where the second set of codebook measurement beams can be disjoint from the first set codebook measurement beams. In addition, the processor can be configured to perform a second set of fourth measurements on the second set of codebook measurement beams at a second measurement opportunity for CBBF, and select a second receiving beam of the UE having a best fourth measurement among the second set of fourth measurements on the second set of codebook measurement beams.

In some embodiments, the set of test beams $\{0, \ldots, N_{test}-1\}$ is a first set of test beams, and the processor can be further configured to select a second set of test beams $K_{test,0}$ from the first set of test beams, wherein the second set of test beams $K_{test,0}$ includes a maximal test beam having a maximum calculated third measurement among the set of calculated third measurements corresponding to the first set of test beams. A test beam is included in the second set of test beams when a difference between a third measurement associated with the test beam and the maximum calculated third measurement is within a threshold. The processor can be configured to select the set of codebook measurement beams including the number $N_{CB,max}$ of beams from the second set of test beams $K_{test,0}$ based on the calculated set of third measurements.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
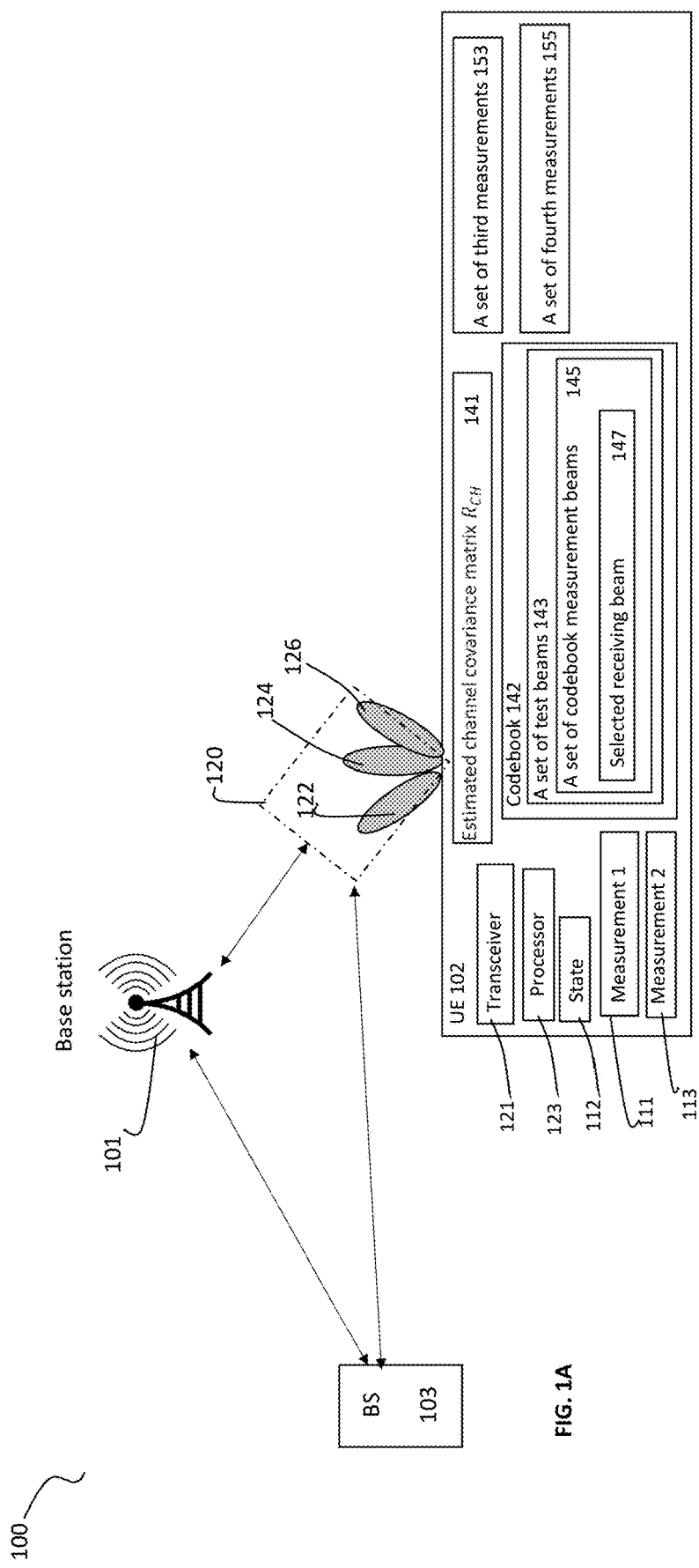
FIGS. 1A-1B illustrate an example wireless system for selecting a receiving beam based on hybrid channel based beamforming and codebook based beamforming in a wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless communication network or system, a user equipment (UE) communicates with a base station, such as an evolved Node B (eNB), a next generation node B (gNB), or other base station. A wireless communication system can include a fifth generation (5G) system, a New Radio (NR) system, a long term evolution (LTE) system, a combination thereof, or some other wireless systems. In a 5G NR, 4G LTE wireless system, or any other wireless systems such as a 6G system, multiple input-multiple output (MIMO) transmission can be an important technology. A UE can include an antenna array or system having a plurality of antenna panels, where an antenna panel can include an array of antenna elements that can be located in close physical location to each other. In some examples, an antenna can be a smart antenna system, where all antenna elements are considered as pseudo-omni or quasi-sector-omni antenna elements including a phase shifter. A directional beam, such as a transmission (Tx) beam or a receiving (Rx) beam, can be formed by adjusting the phase shifter of the antenna element. Descriptions herein may use a receiving beam as an example, and the descriptions may be similarly applicable to a transmission beam. Descriptions herein may be provided for the UE as examples. Techniques can be similarly applicable to a base station when beamforming is used by the base station.

A transmission beam or a receiving beam can be formed based on the control of a beamforming component, which may apply channel based beamforming (CHBF) or codebook based beamforming (CBBF). In general, the selection of a receiving beam based on CHBF may be more efficient without multiple measurements performed at multiple measurement opportunities, but the result may be less accurate. However, the selection of a receiving beam based on CBBF may be more accurate based on multiple measurements performed at multiple measurement opportunities, but CBBF based selection may be less efficient. Embodiments herein present a process for hybrid CHBF and CBBF, which may be referred to as CHBF-assisted CBBF acquisition. The hybrid CHBF and CBBF applies an initial CHBF to derive the estimated channel covariance matrix $R_{CH}$, further acquire the relevant beams based on the estimated channel covariance matrix $R_{CH}$, followed by switching to CBBF to fine-select the receiving beam based on measurements on the relevant beams instead of measurements on all beams. Accordingly, the hybrid CHBF and CBBF can retain accurate results with improved efficiency.

Figure 1B:
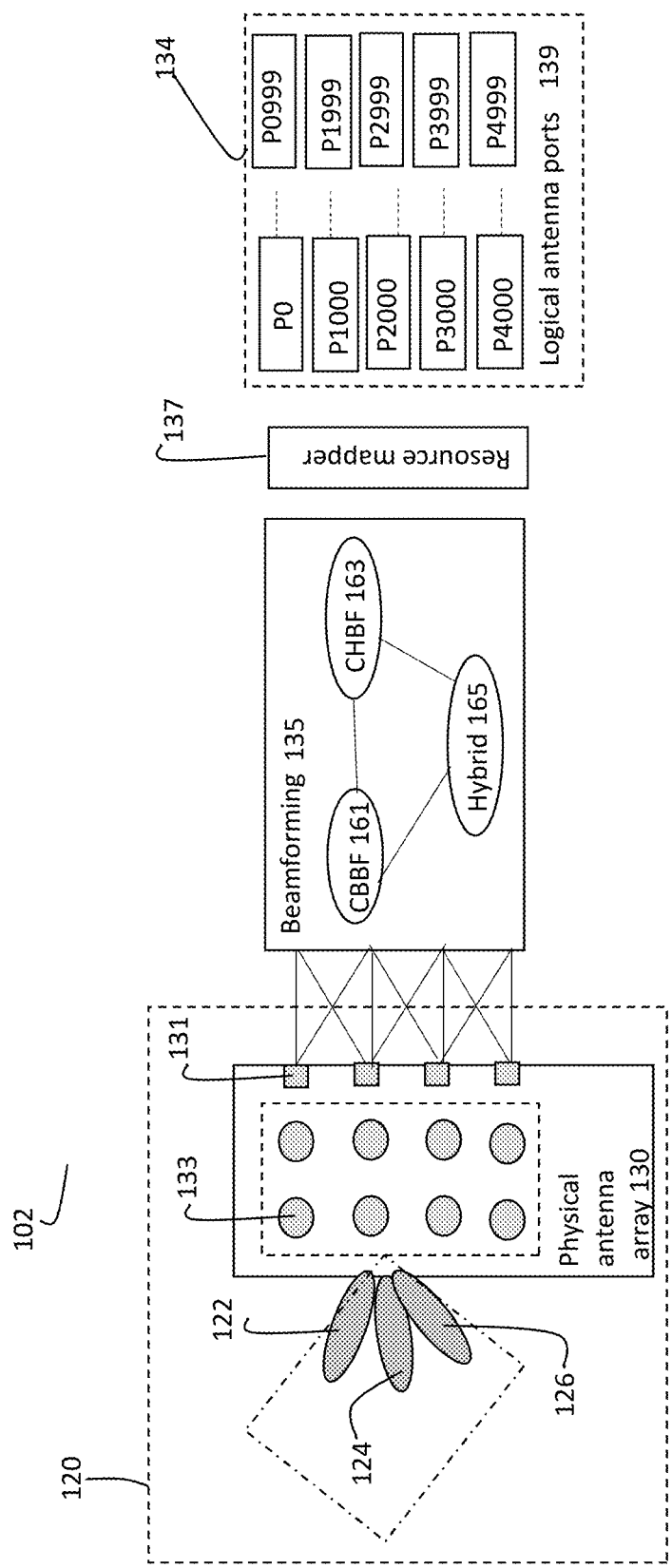

FIGS. 1A-1B illustrate an example wireless system 100 for selecting a receiving beam based on hybrid channel based beamforming and codebook based beamforming in a wireless communication system, according to some aspects of the disclosure. The wireless system 100 is provided for the purpose of illustration only and does not limit the disclosed aspects. As shown in FIG. 1A, system 100 can include, but is not limited to, a network node (herein referred to as a base station) 101, another base station 103, and one or more UEs, such as a UE 102. System 100 can further include additional components, not shown.

According to some aspects, a base station, such as base station 101 or base station 103, can include a node configured to operate based on a wide variety of wireless communication techniques such as, but not limited to, techniques based on 3rd Generation Partnership Project (3GPP) standards. For example, base station 101 can include a node configured to operate using Rel-16, Rel-17, or others. Base station 101 can be a fixed station, and may also be called a base transceiver system (BTS), an access point (AP), a transmission/reception point (TRP), an evolved NodeB (eNB), a next generation node B (gNB), or some other equivalent terminology. System 100 can operate using both licensed cellular spectrum (known as in-band communication) and unlicensed spectrum (known as out-band communication).

According to some aspects, UE 102 can be configured to operate based on a wide variety of wireless communication techniques. These techniques can include, but are not limited to, techniques based on 3GPP standards. For example, UE 102 can be configured to operate using Rel-16, Rel-17 or later. UE 102 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

According to some aspects, UE 102 can include an antenna array or system 120 having a plurality of antenna panels. In general, an antenna system can include one or more antenna panels. An antenna panel can include an array of antenna elements that can be located in close physical location to each other. An antenna element can be an omnidirectional antenna element, a quasi-omnidirectional antenna element, a directional antenna element, or any other antenna element. In some examples, antenna can be a smart antenna system, where all antenna elements are considered as pseudo-omni or quasi-sector-omni antenna elements and include a phase shifter. A directional beam, such as a transmission (Tx) beam or a receiving (Rx) beam, can be formed by adjusting the phase shifter of one or more of the antenna elements. Accordingly, antenna system 120 can provide corresponding antenna beam (herein "beam") 122, beam 124, beam 126. In some examples, there can be more or fewer antenna panels, and an antenna panel can include 2, 4, 8, 16, or other number of antenna elements, which can include a dipole antenna element, a monopole antenna element, a patch antenna element, a loop antenna element, a microstrip antenna element, or any other type of antenna elements suitable for transmission of RF signals.

In some embodiments, more details of UE 102 and antenna system 120 are shown in FIG. 1B. Antenna system 120 can include a physical antenna array 130 having physical antenna ports 131 and multiple antenna elements, such as antenna element 133, which can form an antenna architecture. In some embodiments, the antenna architecture of UE 102 can be a non-coherent antenna architecture, a fully coherent antenna architecture, or a partially coherent antenna architecture including multiple antenna panels. An antenna panel can be coherent within itself with one phase noise.

Antenna elements 133 can provide antenna beams, such as beam 122, beam 124, and beam 126 based on signal excitation through antenna ports 131. In addition, UE 102 can include beamforming component 135 and resource mapper 137. Furthermore, UE 102 can include a group of multiple logic antenna ports 139, which may be simply refers to be "antenna ports" and stored in a memory of the UE, such as memory 201 in FIG. 2. Each antenna port 134 can be related to a function performed by UE 102. Accordingly, the term "antenna port" is a logical concept related to physical layer (L1), but is distinct from the physical RF antenna which is visible and tangible. In other words, each individual downlink or uplink transmission can be carried out from a specific antenna port, the identity of which is known to the UE. In some embodiments, there can be a defined structure in the antenna port numbering such that the antenna ports used for different purposes can have numbers in different ranges. Accordingly, an "antenna port" can be a logical concept that is tied to particular function, but does not necessarily correspond to a specific physical antenna port, even though a physical antenna port is ultimately used signal transmission. There is no strict mapping of antenna ports 139 to physical antenna ports 131 in NR, as well as in LTE. There can be a one-to-one mapping between a particular antenna port 134 to a physical antenna port 131. In some embodiments, there can be a multiple-to-one mapping between multiple antenna ports 134 to a physical antenna port 131. The mapping of antenna port 134 to physical antenna ports 131 can be controlled by beam forming component 135 as a given beam may need to transmit the signal on one or more particular antenna ports to form a desired beam.

In some embodiments, such as in a NR system operating at frequency range 2 (FR2) from 24.25 GHz to 52.6 GHz, various RX-beamforming can be applied. In some embodiments, as in state 161, CBBF can be applied. CBBF operates by measuring Reference Signal Received Power (RSRP) for RX-beams from a codebook on resources like synchronization signal blocks (SSB) (PSS, SSS, DMRS, PBCH), Channel State Information Reference Signal (CSI-RS), to acquire the best RX-beam and track the best RX-beam. One challenge with CBBF is that typically several measurement opportunities are needed for CBBF. For example, assuming a codebook with 11 beams, 3 RX-beams can be measured at a single SSB measurement opportunity, a total of 4 SSB measurement opportunities are needed to measure all 11 beams, corresponding to 120 ms in case of 40 ms SSB periodicity. If the best RX-beam is measured in the first out of the 4 measurement opportunities, it can already be outdated once all 4 measurement opportunities are used to measure all 11 beams.

In some embodiments, as in state 163, CHBF can be applied on resources like SSB and CSI-RS. CHBF first estimates the channel at the RX antenna elements, computes the spatial RX estimated channel covariance matrix $R_{CH}$ from the estimates, and then determines the best RX-beam from the estimates in a single step. When CHBF is applied, there is only a single measurement opportunity needed to directly derive the best beam, and the derived best beam is not outdated.

Figure 3:
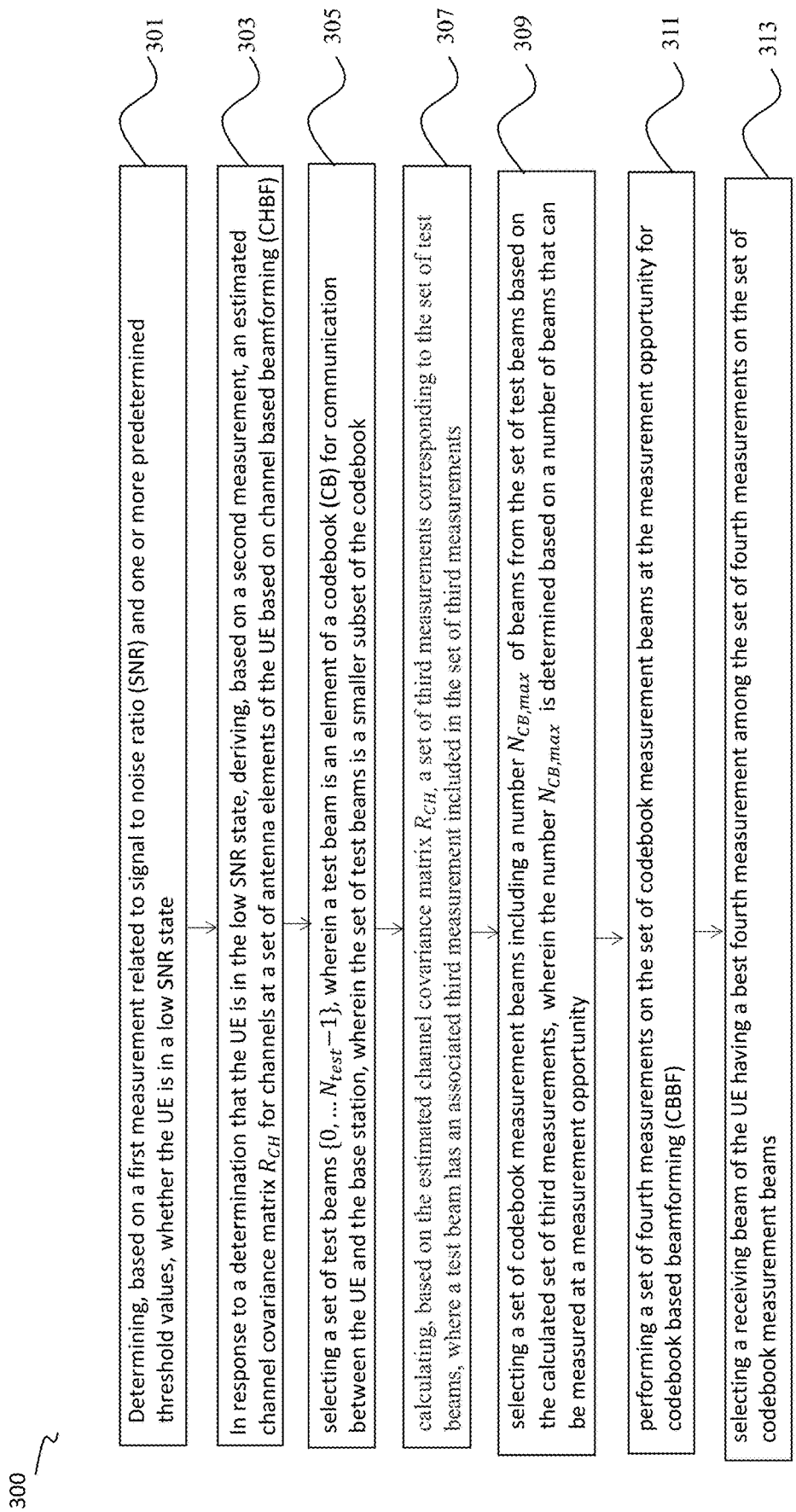
FIGS. 3-4 illustrates example processes performed by a UE to select a receiving beam based on hybrid channel based beamforming and codebook based beamforming in a wireless communication system, according to some aspects of the disclosure.

In some embodiments, as in state 165, in case of low SNR, a hybrid of CHBF and CBBF can be applied, as shown in process 300 illustrated in FIG. 3. In low SNR, the covariance matrix $R_{CH}$ determined by CHBF can be generally noisier, and thus the estimated best RX beam that is computed from the covariance matrix $R_{CH}$ might not correspond to the best RX beam in reality. In such cases, the CBBF which directly measures RSRP on beams from a codebook can achieve better accuracy. On the other hand, the CHBF can react faster on updating the best beam in case of rotating scenarios. Embodiments herein, such as shown in FIG. 3, can intrinsically combine CHBF and CBBF into a hybrid RX-beamforming that can be understood as the performance envelope of CHBF and CBBF. Accordingly, in case of low SNR, CHBF has lower performance compared to CBBF, especially in static conditions, while in medium to high SNR conditions CHBF can have better performance. The hybrid of CHBF and CBBF can take advantage of both CHBF and CBBF, hence improving both CHBF and CBBF.

In some embodiments, antenna architecture may include cross polarized antenna arrays. Two arrays constituting the cross-polarized array may be referred to as a vertical V-array and a horizontal H-array. In case of CHBF, two covariance matrices, one for V-array and one for H-array, may be derived for a cross polarized antenna array. In case of CBBF, beamforming can be done per polarization V-array and H-array, or jointly for V-array and H-array. Accordingly, three codebooks may be maintained in total for CBBF: a VH-codebook where each entry contains beams for each of the two polarizations, a V-codebook that contains beams optimized for the V-array, and a H-codebook that contains beams optimized for the H-array. An entry of the joint VH-codebook can be selected by taking the sum of RSRP of the two constituting V-/H-arrays into account, while for the V-/H-codebooks the V-array RSRP or H-array RSRP is considered. In some embodiments, there can be two kinds of CBBF. When operating with the VH-codebook in a directionally linked way, the VH-codebook can be constructed in a way that the V-/H-beams are forced into the same spatial direction. When operating with the V-/H-codebooks in a directionally separated way, beams for V-/H-array can be selected independently.

According to some aspects, referring back to FIG. 1A, UE 102 can include a transceiver 121 and a processor 123 communicatively coupled to transceiver 121. Transceiver 121 can be configured to wirelessly communicate with base station 101 and base station 103. According to some aspects, processor 123 can be configured to perform various operations. In some embodiments, UE 102 or processor 123 can perform operations to select a receiving beam based on hybrid CHBF and CBBF when the UE is in a low SNR state 165 shown in FIG. 1B.

In some embodiments, UE 102 can be in a state 112, where state 165 shown in FIG. 1B can be an example of state 112. Processor 123 can determine, based on a first measurement 111 related to SNR, such as a SNR measurement and a rotation measurement, and one or more predetermined threshold values, whether UE 102 is in a low SNR state. Various rotation measurements can be applied. For example, rotation measurements can be obtained via inertial measurement systems like gyroscope+accelerometer. Such a sensor delivers the relative 3D-orientation at a periodicity, such as 10 ms, which is lower than the typical measurement opportunity periodicity of 20 ms or 40 ms. Comparing an orientation delivered at measurement opportunity m0 with one delivered at measurement opportunity m0+1, one can compute the angle of rotation. If this is below a threshold, say 6 degrees for example, the rotation measurement can be determined to be below a predetermined threshold. In response to a determination that the SNR measurement is below the SNR threshold, and a determination that the rotation measurement is below the rotation threshold, processor 123 can make the determination that UE 102 is in the low SNR state, e.g., state 112 is in the low SNR state 165.

In some embodiments, in response to a determination that UE 102 is in the low SNR state 165, processor 123 can derive, based on a second measurement 113, such as a SSB measurement or a CSI-RS measurement, an estimated channel covariance matrix $R_{CH}$ 141 for channels received by the set of antenna elements of UE 101 based on CHBF, and further select a receiving beam of UE 102 based on CBBF. In some embodiments, in response to a determination that UE 102 is not in the low SNR state, processor 123 can perform CHBF to select the receiving beam of the UE based on the estimated channel covariance matrix $R_{CH}$ for channels at the set of antenna elements of UE 102.

In further detail, processor 123 can select a set 143 of test beams $\{0, \ldots N_{test}-1\}$, where a test beam can be an element of a codebook (CB) 142 for communication between UE 102 and base station 101, and the set 143 of test beams can be a smaller subset of the codebook 142. Based on the set 143 of test beams and the estimated channel covariance matrix $R_{CH}$, processor 123 can calculate a set 153 of third measurements such as a RSRP corresponding to the set 143 of test beams, where a test beam has an associated third measurement included in the set 153 of third measurements. In addition, processor 123 can select a set 145 of codebook measurement beams including a number $N_{CB,max}$ of beams from the set 143 of test beams based on the calculated set 153 of third measurements, where the number $N_{CB,max}$ is determined based on a number of beams that can be measured at a measurement opportunity. For example, the number $N_{CB,max}$ can be a maximum number of beams that can be measured at the measurement opportunity. In some examples, the processor can be configured to select the number $N_{CB,max}$ of beams from the set of test beams, where the selected beams are among the $N_{CB,max}$ highest calculated third measurements.

Afterwards, processor 123 can perform a set 155 of fourth measurements such as a set of RSRPs on the set 145 of codebook measurement beams at the measurement opportunity for CBBF, and select a receiving beam 147 of the UE having a best fourth measurement among the set 155 of fourth measurements on the set 145 of codebook measurement beams. In addition, processor 123 can determine whether the selected receiving beam 147 for CBBF is unreliable based on a tracking reliability indicator of the selected receiving beam.

In some embodiments, the set 130 of antenna elements can be a first set of antenna elements of UE 102, the receiving beam 147 can be a first receiving beam for the first set of antenna elements, and UE 102 can further include a second set of antenna elements to form a cross polarized antenna array for the UE with the first set of antenna elements. Processor 123 can select a second receiving beam of UE 102 among the second set of antenna elements, based on a joint codebook for the first set antenna elements and the second set of antenna elements.

Figure 2:
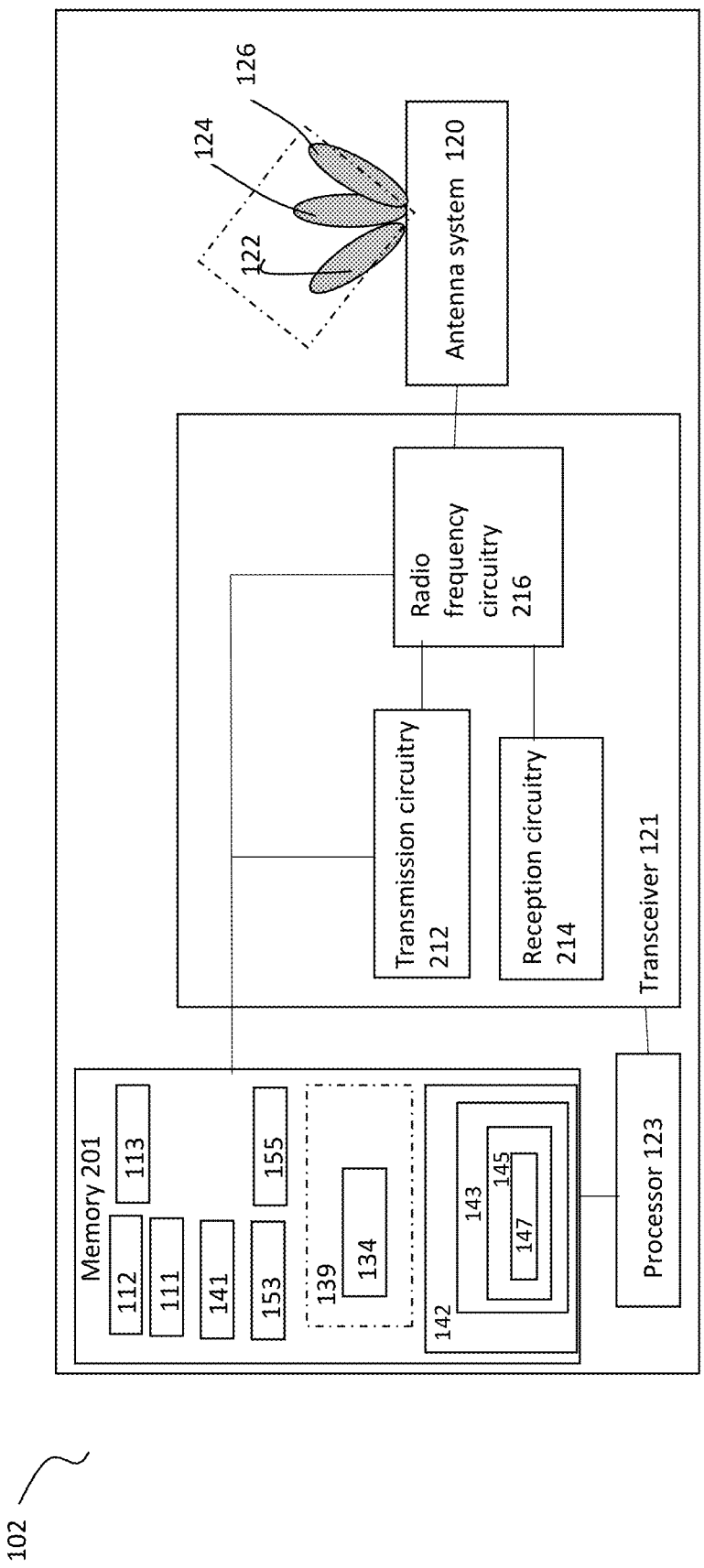
FIG. 2 illustrates a block diagram of a UE implementing support for selecting a receiving beam based on hybrid channel based beamforming and codebook based beamforming in a wireless communication system, according to some aspects of the disclosure.

According to some aspects, UE 102 can be implemented according to a block diagram as illustrated in FIG. 2. Referring to FIG. 2, UE 102 can have antenna system 120 including one or more antenna elements to form various beams, e.g., beam 122, beam 124, or beam 126, coupled to transceiver 121 and controlled by processor 123. Transceiver 121 and antenna system 120 can be configured to enable wireless communication in a wireless network, such as wireless system 100, including wireless communication with base station 101. In detail, transceiver 121 can include radio frequency (RF) circuitry 216, transmission circuitry 212, and reception circuitry 214 to enable wireless communication with other UEs and/or a base station as discussed for wireless system 100. RF circuitry 216 can include multiple parallel RF chains for one or more of transmit or receive functions, each connected to one or more antenna elements of the antenna panel. In addition, processor 123 can be communicatively coupled to a memory 201, which are further coupled to the transceiver 121. Various data can be stored in memory 201, as described for FIGS. 1A-1B.

In some embodiments, memory 201 can store instructions, that when executed by processor 123 perform or cause to perform operations described herein, e.g., operations for selecting a receiving beam based on hybrid channel based beamforming and codebook based beamforming in a wireless communication system. Alternatively, processor 123 can be "hard-coded" to perform the operations described herein. In some embodiments, processor 123 can be configured to perform operations described for FIG. 3.

FIG. 3 illustrates an example process 300 performed by UE 102 to select a receiving beam based on hybrid CHBF and CBBF in a wireless communication system, according to some aspects of the disclosure. Process 300 can be performed by UE 102, which may be implemented as shown in FIG. 2. Process 300 may also be performed by a computer system 500 of FIG. 5. Descriptions herein may be provided for the UE as examples. Techniques can be similarly applicable to a base station when beamforming is used by the base station. Process 300 is not limited to the specific aspects depicted in those figures and other systems may be used to perform the method as will be understood by those skilled in the art. It is to be appreciated that not all operations may be needed, and the operations may not be performed in the same order as shown in process 300. Process 300 for hybrid CHBF and CBBF, which may be referred to as CHBF-assisted CBBF acquisition, applies an initial CHBF to coarse select the relevant beams, followed by switching to CBBF to fine-select and then track the best beam based on the measurements performed on the selected relevant beams.

At 301, processor 123 of UE 102 can determine, based on a first measurement related to SNR and one or more predetermined threshold values, whether the UE is in a low SNR state. For example, processor 123 can determine, based on the first measurement 111 related to SNR and one or more predetermined threshold values, whether state 112 of UE 102 is in a low SNR state. In some embodiments, the first measurement 111 can include a SNR measurement and a rotation measurement. Processor 123 can determine whether the SNR measurement is below a SNR threshold, and determine whether the rotation measurement is below a rotation threshold. In response to a determination that the SNR measurement is below the SNR threshold, and a determination that the rotation measurement is below the rotation threshold, processor 123 can make the determination that the UE is in the low SNR state. The SNR threshold may take into account the precision of the covariance matrix estimation, which may be the reason of degradations of CHBF versus CBBF. The rotation threshold may take into consideration that CBBF has a certain level of tracking capabilities once it acquired the best beam.

At 303, in response to a determination that the UE is in the low SNR state, processor 123 of UE 102 can derive, based on a second measurement, an estimated channel covariance matrix $R_{CH}$ for channels received by a set of antenna elements of the UE based on CHBF. In some embodiments, processor 123 of UE 102 can derive, based on the second measurement, such as a SSB measurement or a CSI-RS measurement, an estimated channel covariance matrix $R_{CH}$ 141 for channels received by the set of antenna elements of UE 101 based on CHBF.

Figure 4:
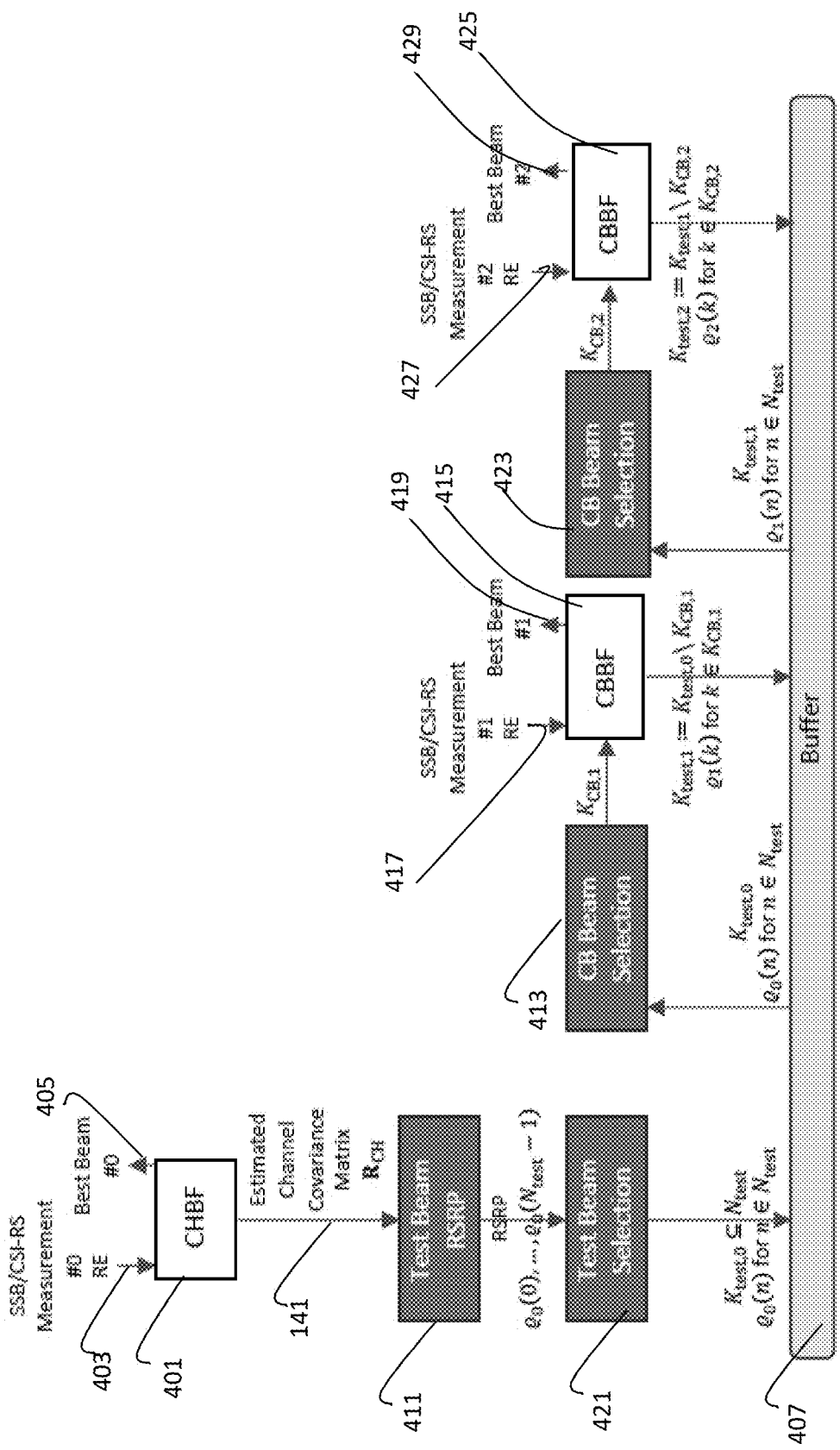

In some embodiments, as shown in FIG. 4, operations at 303 can be implemented at 401. SSB measurements or CSI-RS measurements can be received as inputs 403 to perform CHBF to generate the estimated channel covariance matrix $R_{CH}$ 141. The CHBF at 401 computes the estimated channel covariance matrix $R_{CH} \in \mathbb{C}^{N_{AE} \times N_{AE}}$, where $N_{AE}$ denotes the number of antenna elements, $N_{AE}=4$ for example. It also determines the best beam as an output 405 for operations at 401. Accordingly, operations are performed before 401 to obtain the initial SSB/CSI-RS measurements, CHBF is then performed at 401 to determine the channel covariance matrix $R_{CH}$ 141.

In some embodiments, operations after operations at 303 are CBBF processing operations to compute the RSRP for all configured CB-beams. The major steps involve a set of test beams selection operations at 305 based on test beam RSRP computation from CHBF channel covariance matrix $R_{CH}$, where the test beams are selected as relevant beams for the CBBF refinement. Hence, CBBF is only performed on a subset of relevant beams instead of on all beams, leading to performance improvement over the conventional CBBF alone approach. The CBBF refinement works by selecting the best not yet measured test beams. In some embodiments, the best beam is always included into the CBBF refinement irrespective if it was measured already, plus the next-best-beams to always utilize the measurement capability of the CBBF per measurement opportunity. Once all relevant test beams are measured, the CBBF continues its normal operation tracking the best beam as in case of ordinary CBBF.

At 305, processor 123 of UE 102 can select a set of test beams $\{0, \ldots N_{test}-1\}$, where a test beam is an element of a codebook (CB) for communication between the UE and the base station, and the set of test beams is a smaller subset of the codebook. At 307, processor 123 of UE 102 can calculate, based on the estimated channel covariance matrix $R_{CH}$, a set of third measurements corresponding to the set of test beams, where a test beam has an associated third measurement included in the set of third measurements. In some embodiments, operations at 305 and 307 can be implemented as operations performed at 411 and 421 shown in FIG. 4.

In some embodiments, a test beam may simply be an element from a code book (CB) that is a candidate for CBBF CB-beam in case of CHBF-assisted CBBF acquisition. The set of test beams may be constructed to cover sufficiently all relevant spatial directions. In some embodiments, there can be $\{0, \ldots N_{test}-1\}$ test beams, $N_{test}=11$ in case of $N_{AE}=4$. Operations can be performed at 411 to calculate a set of third measurements, such as RSRP, corresponding to the set of test beams. From $R_{CH}$, the RSRP $\varrho_0(n)$ for all $n \in \{0, \ldots, N_{test}-1\}$ can be computed by $\varrho_0(n):=w_n^H R_{CH} w_n$. In addition, operations can be performed at 421, where RSRP $\varrho_0(n)$ with $n \in \{0, \ldots, N_{test}-1\}$ can be used to select the test beams to be used for the CBBF operation. In some embodiments, the selection can be performed by a configurable threshold $\varrho_{thresh}$, by defining $K_{test,0}$ to be the set of all $n \in \{0, \ldots, N_{test}-1\}$ such that $\varrho_0(n_{max}) - \varrho_0(n) \le \varrho_{thresh}$, where $n_{max}$ corresponds to the test beam with maximum RSRP. All RSRP $\varrho_0(n)$ with $n \in \{0, \ldots, N_{test}-1\}$ and $K_{test,0}$ are saved in a buffer 407 for future processing. Accordingly, the selection of the set of test beams $\{0, \ldots N_{test}-1\}$ is based on the calculated RSRP $\varrho_0(n)$ with $n \in \{0, \ldots, N_{test}-1\}$, instead of performing real measurement on the transmission medium to obtain the measurement results. The calculation of RSRP $\varrho_0(n)$ with $n \in \{0, \ldots, N_{test}-1\}$ based on CHBF channel covariance matrix $R_{CH}$ can be more efficient than performing the actual measurements to obtain the RSRP measurements on the test beams.

At 309, processor 123 of UE 102 can select a set of codebook measurement beams including a number $N_{CB,max}$ of beams from the set of test beams based on the calculated set of third measurements, where the number $N_{CB,max}$ can be determined based on a number of beams that can be measured at a measurement opportunity. In some embodiments, operations at 309 can be implemented as operations performed at 413 shown in FIG. 4.

In some embodiments, as shown in FIG. 4, operations can be performed at 413 to read $K_{test,i}$ and $\varrho_i(n)$ with $n \in \{0, \ldots, N_{test}-1\}$ from the buffer 407. Afterwards, operations can be performed at 413 to determine the up to $N_{CB,max}-1$ best beams in terms of $\varrho_i(n)$ and $n \in K_{test,i} \setminus \{n_{best,i}\}$ and collect its indices together with $n_{best,i}$ into the set $S \subseteq K_{test,i} / \{n_{best,i}\}$. Here, $n_{best,i}$ corresponds to the beam with maximum RSRP from $\{0, \ldots, N_{test}-1\} \setminus K_{test,i}$ for $i>0$, and to the beam with maximum RSRP from $\{0, \ldots, N_{test}-1\}$ otherwise. Further, $N_{CB,max}$ corresponds to the maximum number of beams the CBBF can measure at a measurement opportunity, $N_{CB,max}=3$ in case of SSB for example. Accordingly, operations are performed to measure the up-to-date best beam together with the best test beams not measured yet. Further, the $N_{CB,max}-|S|$ best beams can be collected from $\{0, \ldots, N_{test}-1\}\backslash S$ into the set S' to fully utilize the measurement capability of the CBBF. Furthermore, the set $K_{CB,i+1}:=S\cup S'$ can be delivered as the selected CB beams to be measured at measurement opportunity i+1.

At 311, processor 123 of UE 102 can perform a set of fourth measurements on the set of codebook measurement beams at the measurement opportunity for codebook based beamforming (CBBF). At 313, processor 123 of UE 102 can select a receiving beam of the UE having a best fourth measurement among the set of fourth measurements on the set of codebook measurement beams. In some embodiments, operations at 311 and at 313 can be implemented as operations performed at 415 shown in FIG. 4. In some embodiments, operations performed at 415 can be used to transition into ordinary CBBF operation.

In some embodiments, operations can be performed at 413 to compute the RSRP $\varrho_{i+1}(k)$ for $k \in K_{test,i+1}$ at measurement opportunity i+1 for i=0. Measurements, such as SSB or CSI-RS measurements can be performed and provided as inputs 417 to CBBF performed at 415. In addition, CBBF performed at 415 can select the receiving beam 419 having a best fourth measurement among the set of fourth measurements on the set of codebook measurement beams.

In some embodiments, operations at 311 and at 313 for performing the fourth measurements on the set of codebook measurement beams at the measurement opportunity for CBBF can be an iterative process. The set of fourth measurements on the set of codebook measurement beams at the measurement opportunity can be a first set of fourth measurements on a first set of codebook measurement beams at a first measurement opportunity. Processor 123 of UE 102 can further select a second set of codebook measurement beams including the number $N_{CB,max}$ of beams from the set of test beams based on the calculated set of third measurements, where the second set of codebook measurement beams can be disjoint from the first set codebook measurement beams. For the a second set of codebook measurement beams, processor 123 can perform a second set of fourth measurements on the second set of codebook measurement beams at a second measurement opportunity for CBBF, and select a second receiving beam of the UE having a best fourth measurement among the second set of fourth measurements on the second set of codebook measurement beams. In some embodiments, the iterative process of operations at 311 and at 313 can be implemented as operations performed at 423 and at 425 shown in FIG. 4.

In some embodiments, operations can be performed at 423 to compute the RSRP $\varrho_{i+1}(k)$ for $k \in K_{test,i+1}$ at measurement opportunity i+1 to select a second set of codebook measurement beams that is different from the first set of codebook measurement beams at the first measurement opportunity performed at 413. Measurements, such as SSB or CSI-RS measurements can be performed and provided as inputs 427 to CBBF performed at 425. In addition, CBBF performed at 425 can select the receiving beam 429 having a best fourth measurement among the set of fourth measurements on the second set of codebook measurement beams. Accordingly, the receiving beam 429 is selected among the second set of codebook measurement beams and the receiving beam 419 is selected among the first set of codebook measurement beams.

In some embodiments, after CBBF is executed for measurement opportunity i+1, $K_{test,i}$ can be replaced by $K_{test,i+1}:=K_{test,i}\backslash K_{CB,i+1}$ in the buffer 407 to update the buffer. In embodiments, test beams that have already been measured by CHBF are not measured again at the next measurement opportunity, $\varrho_i(k)$ can be replaced by $\varrho_{i+1}(k)$ for $k \in K_{test,i+1}$ in the buffer 407, and carry forward RSRP $\varrho_i(n)$ for $\varrho_{i+1}(kn)$ for $n \in K_{test,i+1}$. In case of $K_{test,i+1}$ is empty, ordinary CBBF operation can be performed to track the best beam selected as the receiving beam 419.

In some embodiments, operations can be performed to determine whether the selected receiving beam of the UE for CBBF is unreliable based on a tracking reliability indicator of the selected receiving beam. If the selected receiving beam of the UE for CBBF is unreliable, UE 102 can enter CHBF-assisted CBBF acquisition again to re-acquire the best beam, assuming UE 102 is still in a low SNR state.

In some embodiments, there can be various ways to detect if the current best beam is unreliable in context of CBBF based on a tracking reliability indicator of the selected receiving beam. A tracking reliability indicator can provide a numerical qualitative indication of how non-ambiguous the identification of the currently recommended payload beam is, and how well beam-changes can be followed. A higher numerical value indicates a higher reliability. The indicator value is increased if any of the criteria given below is true by a value specific to each criteria and starting from an initial value of zero. Criteria used to determine the indicator value may include whether the currently recommended payload beam is based on tracking state information which indicates an uninterrupted history for at least a threshold. In some embodiments, the threshold can include N1 invocations of being able to follow beam switches, N2 invocations of being able to follow intended beam width changes, or N3 invocations of being currently on a beam which matches the intended beam width. If the tracking reliability indicator falls below a threshold, CHBF could be activated for re-acquisition of the best beam.

In some embodiments, CHBF-assisted CBBF acquisition can be extended to be performed for a UE having a joint V-/H-Array. In some embodiments, CHBF-assisted CBBF acquisition can be performed individually per V-/H-array. In some embodiments, different methods can be performed a UE having a joint V-/H-Array. At the initial CHBF run, the best beam and associated RSRP per V-/H-array can be computed. Assume without general restriction that the RSRP of the V-array is higher than the RSRP of the H-array. In this case, if the H-RSRP is below a certain threshold, it is expected that the best beam cannot be acquired at sufficient quality, also not in case of subsequent CBBF refinement. Thus, instead of selecting the beams independently from the V-/H-codebooks, the VH-codebook can be used for CBBF refinement. To do so, the CB-beams can be first determined on the V-array via CHBF, and process both the V- and H-array jointly in the subsequent CBBF refinement, computing the RSRP-sum of V-/H-array, using the V-array CB-beams to derive the associated H-array CB-beams according to the VH-codebook. Therefore, the VH-codebook can be fetched by a V-/H-beam pair with a V-beam index or H-beam index only, which can be done via two mapping tables for V-/H-array beams.

Figure 5:
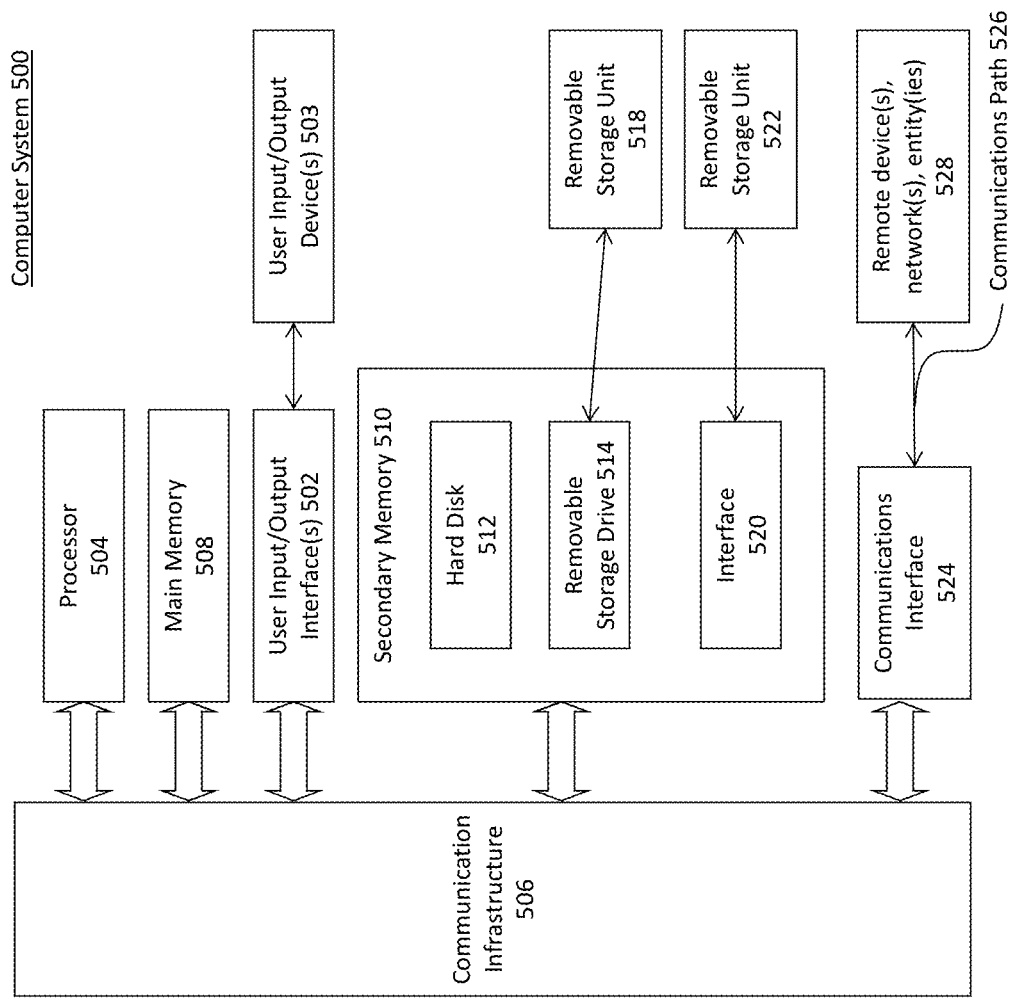
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 102 or base station 101 in FIG. 1, for operations described for processor 123 or process 300.

Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE, UE 102 or base station 101 in in FIG. 1, for operations described for processor 123 or process 300.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method of wireless communications by a user equipment (UE) with a base station in a wireless system, comprising:
   determining, based on a first measurement related to signal to noise ratio (SNR) and one or more predetermined threshold values, whether the UE is in a low SNR state;
   in response to a determination that the UE is in the low SNR state, deriving, based on a second measurement, an estimated channel covariance matrix $R_{CH}$ for channels received by a set of antenna elements of the UE using channel based beamforming (CHBF);
   selecting a set of test beams $\{0, \ldots N_{test}-1\}$, wherein test beam is an element of a codebook for communication between the UE and the base station, wherein the set of test beams is a subset of the codebook;
   selecting a set of codebook measurement beams comprising a number $N_{CB,max}$ of beams from the set of test beams based on a set of third measurements corresponding to the set of test beams calculated based on the estimated channel covariance matrix $R_{CH}$, wherein the number $N_{CB,max}$ is determined based on a number of beams that can be measured at a measurement opportunity; and
   selecting a receiving beam of the UE having a best measurement among a set of fourth measurements performed on the set of codebook measurement beams at the measurement opportunity for codebook based beamforming (CBBF).

2. The method of claim 1, wherein the number $N_{CB,max}$ is a maximum number of beams that can be measured at the measurement opportunity.

3. The method of claim 1, wherein the set of fourth measurements on the set of codebook measurement beams at the measurement opportunity is a first set of fourth measurements on a first set of codebook measurement beams at a first measurement opportunity, and the method further comprises:
   selecting a second set of codebook measurement beams including the number $N_{CB,max}$ of beams from the set of test beams based on the calculated set of third measurements, wherein the second set of codebook measurement beams is disjoint from the first set of codebook measurement beams;
   performing a second set of fourth measurements on the second set of codebook measurement beams at a second measurement opportunity for CBBF; and
   selecting a second receiving beam of the UE having a best measurement among the second set of fourth measurements on the second set of codebook measurement beams.

4. The method of claim 1, wherein the selecting the set of codebook measurement beams including the number $N_{CB,max}$ of beams from the set of test beams based on the calculated set of third measurements comprises selecting the number $N_{CB,max}$ of beams from the set of test beams having $N_{CB,max}$ highest calculated third measurements.

5. The method of claim 1, wherein the first measurement related to SNR includes a SNR measurement and a rotation measurement;
   wherein the second measurement includes a synchronization signal blocks (SSB) measurement or a Channel State Information Reference Signal (CSI-RS) measurement;
   a third measurement includes a Reference Signal Received Power (RSRP); and
   a fourth measurement includes the RSRP.

6. The method of claim 5, wherein the determining whether the UE is in the low SNR state comprises:
   determining whether the SNR measurement is below a SNR threshold;
   determining whether the rotation measurement is below a rotation threshold; and
   in response to a determination that the SNR measurement is below the SNR threshold, and a determination that the rotation measurement is below the rotation threshold, making a determination that the UE is in the low SNR state.

7. The method of claim 1, wherein the set of test beams $\{0, \ldots, N_{test}-1\}$ is a first set of test beams, and the method further comprises:
   selecting a second set of test beams $K_{test,0}$ from the first set of test beams, wherein the second set of test beams $K_{test,0}$ includes a maximal test beam having a maximum calculated third measurement among the set of calculated third measurements corresponding to the first set of test beams, and a test beam is included in the second set of test beams when a difference between a third measurement associated with the test beam and the maximum calculated third measurement is within a threshold; and
   selecting the set of codebook measurement beams including the number $N_{CB,max}$ of beams from the second set of test beams $K_{test,0}$ based on the calculated set of third measurements.

8. The method of claim 1, further comprising:
in response to a determination that the UE is not in the low SNR state, performing the CHBF to select the receiving beam of the UE based on the estimated channel covariance matrix $R_{CH}$ for channels at the set of antenna elements of the UE.

9. The method of claim 1, wherein the set of antenna elements is a first set of antenna elements of the UE, the receiving beam is a first receiving beam for the first set of antenna elements, and the UE further includes a second set of antenna elements to form a cross polarized antenna array for the UE with the first set of antenna elements, and the method further comprises:
selecting a second receiving beam of the UE among the second set of antenna elements, based on a joint codebook for the first set antenna elements and the second set of antenna elements.

10. The method of claim 1, further comprising:
determining whether the selected receiving beam of the UE for CBBF is unreliable based on a tracking reliability indicator of the selected receiving beam.

11. A user equipment (UE), comprising:
a transceiver configured to enable wireless communication with a base station; and
a processor communicatively coupled to the transceiver and configured to:
determine, based on a first measurement related to signal to noise ratio (SNR) and one or more predetermined threshold values, whether the UE is in a low SNR state;
in response to a determination that the UE is in the low SNR state, derive, based on a second measurement, an estimated channel covariance matrix $R_{CH}$ for channels received by a set of antenna elements of the UE using channel based beamforming (CHBF);
select a set of test beams $\{0, \ldots N_{test}-1\}$, wherein test beam is an element of a codebook for communication between the UE and the base station, wherein the set of test beams is a subset of the codebook;
select a set of codebook measurement beams comprising a number $N_{CB,max}$ of beams from the set of test beams based on a set of third measurements corresponding to the set of test beams calculated based on the estimated channel covariance matrix $R_{CH}$, wherein the number $N_{CB,max}$ is determined based on a number of beams that can be measured at a measurement opportunity; and
select a receiving beam of the UE having a best measurement among a set of fourth measurements performed on the set of codebook measurement beams at the measurement opportunity for codebook based beamforming (CBBF).

12. The UE of claim 11, wherein the number $N_{CB,max}$ is a maximum number of beams that can be measured at the measurement opportunity.

13. The UE of claim 11, wherein to select the set of codebook measurement beams including the number $N_{CB,max}$ of beams from the set of test beams based on the calculated set of third measurements, the processor is configured to select the number $N_{CB,max}$ of beams from the set of test beams having $N_{CB,max}$ highest calculated third measurements.

14. The UE of claim 11, wherein the first measurement related to SNR includes a SNR measurement and a rotation measurement;
wherein the second measurement includes a synchronization signal blocks (SSB) measurement or a Channel State Information Reference Signal (CSI-RS) measurement;
a third measurement includes a Reference Signal Received Power (RSRP); and
a fourth measurement includes the RSRP.

15. The UE of claim 14, wherein to determine whether the UE is in the low SNR state, the processor is configured to:
determine whether the SNR measurement is below a SNR threshold;
determine whether the rotation measurement is below a rotation threshold; and
in response to a determination that the SNR measurement is below the SNR threshold, and a determination that the rotation measurement is below the rotation threshold, make a determination that the UE is in the low SNR state.

16. The UE of claim 11, wherein, in response to a determination that the UE is not in the low SNR state, the processor is configured to perform the CHBF to select the receiving beam of the UE based on the estimated channel covariance matrix $R_{CH}$ for channels at the set of antenna elements of the UE.

17. The UE of claim 11, wherein the set of fourth measurements on the set of codebook measurement beams at the measurement opportunity is a first set of fourth measurements on a first set of codebook measurement beams at a first measurement opportunity, and the processor is further configured to:
select a second set of codebook measurement beams including the number $N_{CB,max}$ of beams from the set of test beams based on the calculated set of third measurements, wherein the second set of codebook measurement beams is disjoint from the first set codebook measurement beams;
perform a second set of fourth measurements on the second set of codebook measurement beams at a second measurement opportunity for CBBF; and
select a second receiving beam of the UE having a best measurement among the second set of fourth measurements on the second set of codebook measurement beams.

18. A non-transitory computer-readable medium storing instructions that, when executed by a processor of a user equipment (UE), cause the UE to perform operations, the operations comprising:
determining, based on a first measurement related to signal to noise ratio (SNR) and one or more predetermined threshold values, whether the UE is in a low SNR state;
in response to a determination that the UE is in the low SNR state, deriving, based on a second measurement, an estimated channel covariance matrix $R_{CH}$ for channels received by a set of antenna elements of the UE using channel based beamforming (CHBF);
selecting a set of test beams $\{0, \ldots N_{test}-1\}$, wherein test beam is an element of a codebook for communication between the UE and a base station, wherein the set of test beams is a subset of the codebook;
selecting a set of codebook measurement beams comprising a number $N_{CB,max}$ of beams from the set of test beams based on a set of third measurements corresponding to the set of test beams calculated based on the estimated channel covariance matrix $R_{CH}$, wherein the number $N_{CB,max}$ is determined based on a number of beams that can be measured at a measurement opportunity; and selecting a receiving beam of the UE having a best measurement among a set of fourth measurements performed on the set of codebook measurement beams at the measurement opportunity for codebook based beamforming (CBBF).

19. The non-transitory computer-readable medium of claim 18, wherein the operations further comprises:

in response to a determination that the UE is not in the low SNR state, performing the CHBF to select the receiving beam of the UE based on the estimated channel covariance matrix $R_{CH}$ for channels at the set of antenna elements of the UE.

20. The non-transitory computer-readable medium of claim 18, wherein the number $N_{CB,max}$ is a maximum number of beams that can be measured at the measurement opportunity, wherein the selecting the set of codebook measurement beams including the number $N_{CB,max}$ of beams from the set of test beams based on the calculated set of third measurements comprises selecting the number $N_{CB,max}$ of beams from the set of test beams having $N_{CB,max}$ highest calculated third measurements.

* * * * *

UNITED STATES PATENT AND TRADEMARK OFFICE
CERTIFICATE OF CORRECTION

| | |
|---|---|
| PATENT NO. | : 11,824,616 B2 |
| APPLICATION NO. | : 17/899178 |
| DATED | : November 21, 2023 |
| INVENTOR(S) | : Eder et al. |

It is certified that error appears in the above-identified patent and that said Letters Patent is hereby corrected as shown below:

In the Specification

In Column 11, Line 43, delete "the a" and insert -- the --, therefor.

Signed and Sealed this
Thirteenth Day of February, 2024

Katherine Kelly Vidal
*Director of the United States Patent and Trademark Office*